United States Patent
Lee et al.

(10) Patent No.: US 7,910,240 B2
(45) Date of Patent: Mar. 22, 2011

(54) SAFETY-IMPROVED ELECTRODE BY INTRODUCING CROSSLINKABLE POLYMER AND ELECTROCHEMICAL DEVICE COMPRISING THE SAME

(75) Inventors: Sang Young Lee, Daejeon (KR); Seok Koo Kim, Daejeon (KR); Jung Don Suk, Daejeon (KR); Hyun Hang Yong, Seoul (KR); Jang Hyuk Hong, Daejeon (KR); Soon Ho Ahn, Daejeon (KR); Yongku Kang, Daejeon (KR); Changjin Lee, Daejeon (KR)

(73) Assignees: LG Chem, Ltd. (KR); Korea Research Institute of Chemical Technology (KR)

( * ) Notice: Subject to any disclaimer, the term of this patent is extended or adjusted under 35 U.S.C. 154(b) by 935 days.

(21) Appl. No.: 11/406,938

(22) Filed: Apr. 19, 2006

(65) Prior Publication Data

US 2006/0246354 A1 Nov. 2, 2006

(30) Foreign Application Priority Data

Apr. 19, 2005 (KR) ........................ 10-2005-0032433

(51) Int. Cl.
H01M 2/16 (2006.01)
H01M 2/18 (2006.01)
(52) U.S. Cl. ........... 429/137; 429/246; 427/58; 427/387
(58) Field of Classification Search .................. 429/137, 429/246; 427/58, 387
See application file for complete search history.

(56) References Cited

U.S. PATENT DOCUMENTS

| 5,643,665 | A | 7/1997 | Saidi |
| 6,416,905 | B1 | 7/2002 | Bronstert et al. |
| 6,509,123 | B1 | 1/2003 | Shibuya et al. |
| 2002/0004165 | A1* | 1/2002 | Akita ............................. 429/126 |
| 2002/0090555 | A1* | 7/2002 | Noh et al. .................... 429/303 |
| 2003/0134968 | A1* | 7/2003 | Kang et al. .................... 524/588 |
| 2004/0043296 | A1* | 3/2004 | Lithium et al. ............... 429/306 |
| 2005/0008938 | A1 | 1/2005 | Cho et al. |

FOREIGN PATENT DOCUMENTS

| JP | 2000299129 | | 10/2000 |
| JP | 2003-277506 | | 10/2003 |
| JP | 2004311237 | | 11/2004 |
| KR | 1020010067222 | | 7/2001 |
| KR | 20010100242 | A1 | 11/2001 |
| KR | 20020057570 | A1 | 7/2002 |
| KR | 20020057571 | A1 | 7/2002 |

(Continued)

OTHER PUBLICATIONS

International Search Report; International Application No. PCT/KR2006/001451; International Filing Date Apr. 19, 2o06; Applicant's File Reference FPC06030-PCT; 3 pages.

(Continued)

*Primary Examiner* — Melvin C Mayes
*Assistant Examiner* — Melissa Stalder
(74) *Attorney, Agent, or Firm* — Cantor Colburn LLP

(57) ABSTRACT

Disclosed is an electrode, comprising a coating layer of crosslinked polymer, formed on a surface of electrode active material particles, while maintaining a pore structure formed among the electrode active material particles interconnected to each other in the electrode. A method for manufacturing the electrode and an electrochemical device comprising the electrode are also disclosed. The electrode, which comprises a coating layer of crosslinked polymer formed on the surface of the electrode active material particles, can improve the safety of a battery, while minimizing degradation in the quality of a battery.

8 Claims, 4 Drawing Sheets

FOREIGN PATENT DOCUMENTS

| | | |
|---|---|---|
| KR | 1020030089750 | 11/2003 |
| KR | 20050023123 A1 | 3/2005 |
| WO | 9502314 | 1/1995 |
| WO | 9526833 | 10/1995 |
| WO | 2005045957 | 5/2005 |

OTHER PUBLICATIONS

Office Action by Korean Patent Office, dated Mar. 29, 2007.
Extended European Search Report for application No. 06757502.7-2119/1889311 dated Jan. 26, 2009.

* cited by examiner (a) 　　(b)

SAFETY-IMPROVED ELECTRODE BY INTRODUCING CROSSLINKABLE POLYMER AND ELECTROCHEMICAL DEVICE COMPRISING THE SAME

This application claims the benefit of the filing date of Korean Patent Application No. 10-2005-0032433, filed on 19 Apr. 2005, in the Korean Intellectual Property Office, the disclosure of which is incorporated herein in its entirely by reference.

TECHNICAL FIELD

The present invention relates to an electrode that can improve the safety of a battery while not adversely affecting the quality of a battery, a method for manufacturing the same, and an electrochemical device comprising the same.

BACKGROUND ART

Recently, there has existed increasing interest in energy storage technology. Batteries have been widely used as energy sources in portable phones, camcorders, notebook computers, PCs and electric cars, resulting in intensive research and development for them. In this regard, electrochemical devices are the subject of great interest. Particularly, development of rechargeable secondary batteries is the focus of attention. Recently, continuous studies have been performed to develop a novel electrode and battery having an improved level of capacity density and specific energy.

Among the currently used secondary batteries, lithium secondary batteries, developed in early 1990's, have a higher drive voltage and energy density than those of conventional batteries using aqueous electrolytes (such as Ni-MH batteries, Ni—Cd batteries and $H_2SO_4$—Pb batteries), and thus are spotlighted in the field of secondary batteries. However, lithium secondary batteries have a problem related to their safety, due to ignition and explosion caused by the use of an organic electrolyte. Also, lithium secondary batteries have a disadvantage in that they are obtained via a relatively complicated manufacturing process.

Evaluation of and security in safety of batteries are very important. It should be considered in the first place that users have to be protected from being damaged due to malfunctioning of batteries. To satisfy this, safety of batteries is strictly restricted in terms of ignition and combustion in batteries by safety standards. Therefore, many attempts have been made to solve safety-related problems of batteries.

In order to prevent heat emission from batteries, various methods including use of a protection circuit, use of heat occlusion by a separator, etc., have been suggested. However, use of a protection circuit causes limitation in downsizing and cost reduction of a battery pack. A mechanism of heat occlusion by a separator often acts inefficiently, when heat emission is generated rapidly. Recently, use of organic electrolyte additives has been also suggested to solve the above-mentioned problems. However, safety mechanisms based on electrolyte additives have disadvantages in that heat emission (J) may be vary depending on charging current or internal resistance of a battery, and timing is not uniform. Therefore, such safety mechanisms are always followed by degradation in the overall quality of a battery.

There have been attempts to use a polymer electrolyte in order to fundamentally solve the aforementioned problems. In general, the safety of a battery increases in the order of a liquid electrolyte<a gel type polymer electrolyte<a solid polymer electrolyte. On the other hand, the quality of a battery decreases in the same order. Because of such poor battery quality, it is known that batteries using solid polymer electrolytes have not yet been commercialized. However, more recently, Sony Corp. (Japan, see U.S. Pat. No. 6,509,123) and Sanyo Corp. (Japan, see Japanese Laid-Open Patent No. 2000-299129) have developed a gel type polymer electrolyte by a unique process and have produced batteries using the electrolyte. In brief, each gel type polymer electrolyte has the following characteristics.

In the case of the Sony's battery, PVdF-co-HFP (polyvinylidene-hexafluoropropylene copolymer) is used as a polymer, and $LiPF_6$ dissolved in a mixed solvent of EC (ethylene carbonate) and PC (propylene carbonate) is used as an electrolyte. The polymer and the electrolyte are mixed in DMC (dimethyl carbonate) as a solvent, the resultant mixture is coated onto the surface of an electrode, and DMC is allowed to evaporate, thereby providing an electrode having a gel type polymer introduced thereto. Then, in order to provide a battery, the electrode is wound along with a polyolefin-based separator, which is used to prevent a short circuit in a battery.

Meanwhile, in the case of the Sanyo's battery, a cell is preliminarily formed by winding a cathode, an anode and a polyolefin-based separator. Next, PVdF (polyvinylidene fluoride), PMMA (polymethyl methacrylate) and PEGDMA (polyethyleneglycol dimethacrylate) and an initiator are mixed with a suitable organic carbonate mixture, and the resultant mixture is injected into the preliminarily formed cell, followed by crosslinking under suitable conditions, thereby providing a gel type polymer electrolyte. In this case, the gel type polymer electrolyte is formed in a battery in situ after the assemblage of the battery.

However, it is known that both gel type polymer electrolytes are prepared by a very complicated process and are somewhat problematic in terms of the productivity. Additionally, in most cases, the gel type polymer electrolytes improve the safety of a battery to a certain degree. However, use of the gel type polymer electrolytes is followed by degradation in the quality of a battery.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

The inventors of the present invention have found that when a coating layer of crosslinked polymer that is swellable with an electrolyte is formed on the surface of electrode active material particles after the manufacture of an electrode, while maintaining the pore structure formed among the electrode active material particles in the preformed electrode, it is possible to improve the safety of a battery while not adversely affecting the quality of a battery.

Therefore, it is an object of the present invention to provide an electrode having a coating layer of the aforementioned crosslinked polymer, partially or totally formed on the surface of electrode active material particles, a method for manufacturing the same and an electrochemical device comprising the same.

According to an aspect of the present invention, there is provided an electrode comprising a coating layer of crosslinked polymer, partially or totally formed on the surface of electrode active material particles, while maintaining the pore structure formed among the electrode active material particles interconnected to each other in the electrode. There is also provided an electrochemical device, preferably a lithium secondary battery, comprising the same electrode.

According to another aspect of the present invention, there is provided a method for manufacturing an electrode having a coating layer of crosslinked polymer, partially or totally formed on the surface of electrode active material particles, while maintaining the pore structure formed among the electrode active material particles in the electrode, the method comprising the steps of: (a) applying slurry comprising an electrode active material onto a current collector and drying the slurry to provide an electrode; (b) dipping the electrode obtained from step (a) into a solution in which monomers forming the crosslinked polymer are dissolved, followed by drying; and (c) curing the electrode coated with the monomers.

Hereinafter, the present invention will be explained in more detail.

The present invention is characterized by forming a coating layer of crosslinked polymer on an electrode preliminarily formed by a conventional method, wherein the coating layer of crosslinked polymer is formed on the surface of electrode active material particles while maintaining the pore structure formed among the electrode active material particles in the electrode.

Figure 1:
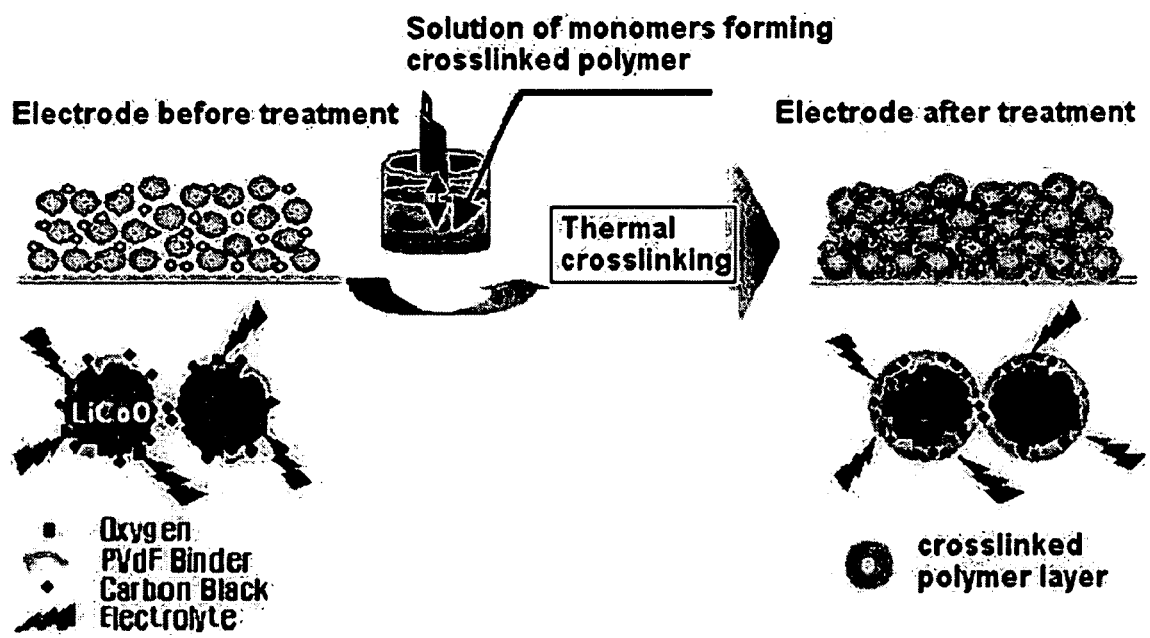
FIG. 1 is a schematic view showing a process for manufacturing an electrode comprising a crosslinked polymer introduced thereto according to the present invention.

More particularly, a preliminarily formed electrode is dipped into a solution containing monomers forming the crosslinked polymer, i.e., monomers capable of forming a three-dimensional network structure via crosslinking under suitable crosslinking conditions, to form the coating layer on the electrode (see FIG. 1). At this time, the solution containing the monomers forming the crosslinked polymer easily infiltrates into the electrode through the pore structure formed among the electrode active material particles in the electrode, so that a uniform and thin coating layer can be formed on the surface of the electrode active materials interconnected to each other, while maintaining the pore structure formed by the interstitial volumes among the electrode active material particles. Then, the monomers are cured under suitable conditions to form a coating layer of crosslinked polymer on the surface of the electrode active material in the electrode.

The electrode according to the present invention, having the aforementioned structural characteristics, can improve the safety of a battery while not adversely affecting the quality of a battery, as described hereinafter.

(1) A conventional electrode may react with a highly reactive electrolyte when an electrode active material is in an unstable state due to extreme conditions such as overcharge or high-temperature storage conditions. As a result, the electrode has increased electric resistance and causes dissolution of the electrode active material, resulting in degradation in the overall quality of a battery.

Figure 3:
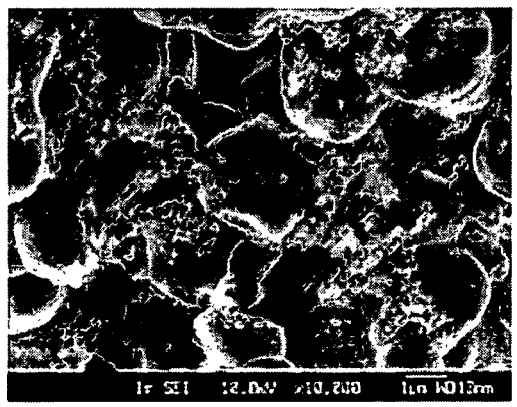
FIG. 3 is photographic views of the cathodes obtained from Example 1 and Comparative Example 1, taken by Scanning Electron Microscope (SEM)
Figure 3:
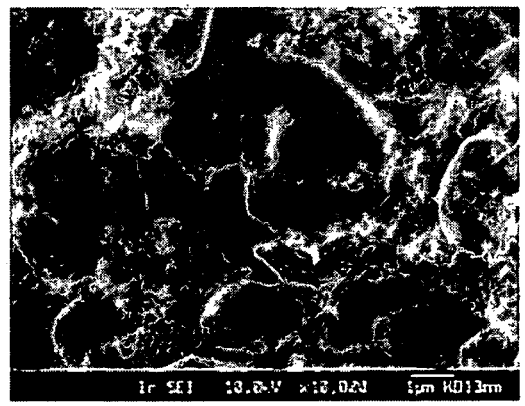

(2) On the contrary, according to the electrode of the present invention, the surface of the electrode active material in the electrode is surrounded totally with a crosslinked polymer. Hence, even after the injection of a conventional electrolyte, the electrode active material is not in contact directly with the electrolyte but in contact with the polymer. As a result, under extreme conditions such as overcharge or high-temperature storage conditions, the reactivity of side reactions between the electrode active material and the electrolyte decreases significantly. Therefore, it is possible to significantly improve the safety of a battery, since the calorific value caused by the side reactions between the electrode and the electrolyte decreases and formation of dendrite on the electrode surface is inhibited. In fact, it can be seen from the following experimental results that the electrode according to the present invention can improve the thermal safety of a battery by inhibiting the side reactions between the electrode and an electrolyte and by reducing the calorific value caused by such side reactions (see FIG. 3).

(3) The electrode according to the present invention is obtained by dipping a preliminarily formed electrode into a solution containing monomers forming a crosslinked polymer to form a coating layer of crosslinked polymer on the surface of the electrode active material particles interconnected to each other, while maintaining the pore structure formed among the electrode active material particles. Thus, when an electrolyte is subsequently injected, the electrolyte can quickly infiltrate into the surface of each electrode active material and/or into the inside thereof. Additionally, the resultant thin polymer coating layer with a thickness of 1 μm or less can minimize degradation in the lithium ion conduction rate, and thus can minimize degradation in the quality of a battery, caused by the formation of the coating layer.

According to the present invention, there is no particular limitation in the polymer coated on the surface of electrode active material particles interconnected to each other, as long as the polymer is cured and crosslinked by way of heat or light irradiation. Particularly, it is preferable to use a polymer having a high degree of swelling with an electrolyte, which is swelled with an electrolyte upon the injection of a liquid electrolyte and then gelled. In other words, the polymer, coated on the surface of the electrode active material particles in the electrode according to the present invention, may be swelled with an electrolyte, and the electrolyte injected after the assemblage of a battery infiltrates into the polymer, so that the polymer containing the electrolyte has electrolyte ion conductivity. Therefore, as compared to conventional conductive polymers or inorganic materials, having no electrolyte ion conductivity, the crosslinked polymer that is swellable with an electrolyte can prevent degradation in the quality of a battery. Additionally, since the crosslinked polymer swellable with an electrolyte shows excellent affinity to an electrolyte, the electrode coated with the polymer also shows increased affinity to an electrolyte. Therefore, it may be expected to provide a battery with improved quality.

Particular examples of the monomers for forming the crosslinked polymer include the compounds represented by the following Formula 1 and/or Formula 2, but are not limited thereto:

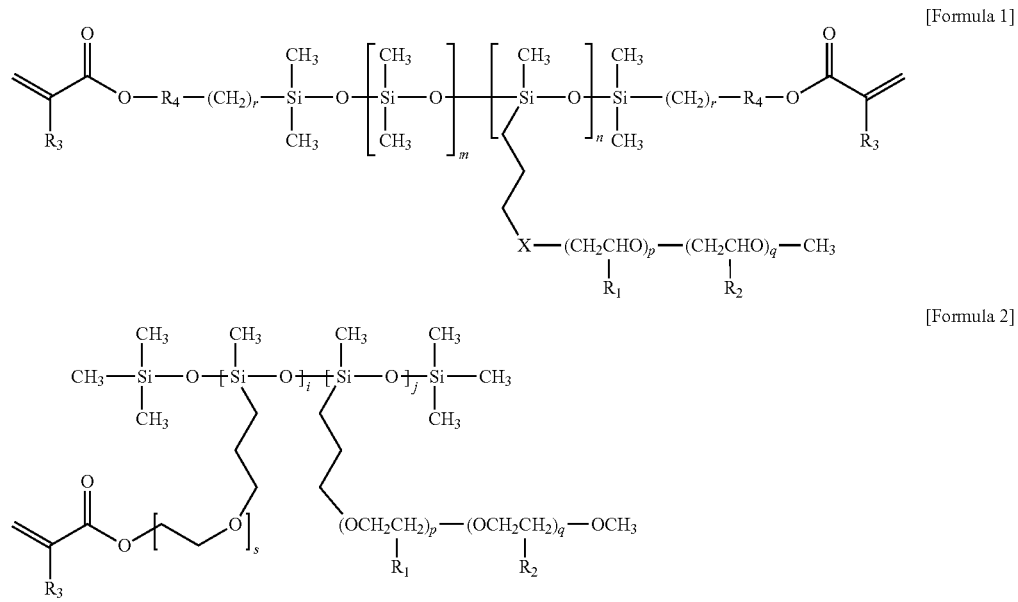

wherein each of $R_1$, $R_2$ and $R_3$ independently represents a hydrogen atom or a C1~C6 lower alkyl group;

$R_4$ represents a single bond or

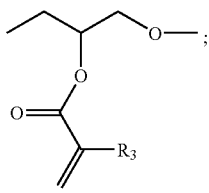

X represents

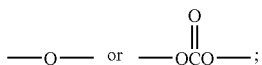

each of n and m represents an integer of 0~1000, each of p and q is an integer of 0~20 with the proviso that p and q cannot represent 0 at the same time, and r is an integer of 1~6; and each of i and j represents an integer of 1~1000, and s is an integer of 1~20.

As used herein, the term "lower" refers to as a group, an atomic group or a compound having at most six carbon atoms, preferably at most five carbon atoms.

The term, "lower alkyl group" means a linear or branched lower saturated aliphatic hydrocarbon and particular examples thereof include methyl, ethyl, n-propyl, isopropyl, n-butyl, sec-butyl, isobutyl, tert-butyl and n-pentyl groups.

The compounds represented by formula 1 and/or formula 2 comprise, as a basic skeleton structure, a polyalkylsiloxane polymer, into which an alkylene oxide group is introduced as a side branch, and a chemically crosslinkable acryl functional group at both ends or as a side branch. Therefore, the compounds can form a crosslinked polymer coating layer having a three-dimensional network structure under suitable crosslinking conditions, and thus can improve the safety of a battery as described above. Additionally, the crosslinked polymer is characterized in that it is crosslinked by being cured via heat or light irradiation as described above. Hence, the crosslinked polymer can show excellent mechanical properties, including orientation and bending characteristics. Further, introduction of the low-molecular weight polyalkylene oxide and other polar multiple side branches, which are known to improve conductivity in the art, results in excellent chemical properties and mechanical properties, including improved ion conductivity. Therefore, the compound can be present stably in a battery with no damages even when repeating charge/discharge cycles.

In addition to the compounds represented by the above formula 1 and/or formula 2, compounds represented by formula 1 and/or formula 2, which further contain or are substituted with a functional group (e.g., polar group) known to one skilled in the art as a group for improving conductivity, are also included in the scope of the present invention.

Preferably, the coating layer of crosslinked polymer is present on the surface of interconnected electrode active material particles and on the surface of a binder that allows the electrode active material particles to be interconnected and fixed to each other, in the form of an independent single phase with no physical and/or chemical mixing with the surfaces, while maintaining the pore structure formed by the electrode active material particles. Additionally, although there is no particular limitation in the thickness of the polymer coating layer, the polymer coating layer preferably has a thickness of 1 nm~10 μm. If the polymer coating layer has a thickness of less than 1 nm, it is not possible to control the reaction heat between an electrode active material and an electrolyte sufficiently. If the polymer coating layer has a thickness of greater than 10 μm, lithium ion conduction rate decreases, resulting in degradation in the overall quality of a battery.

Meanwhile, the crosslinked polymer may be present in such a volumetric content that the pores of an electrode are totally filled with the crosslinked polymer. However, the content of the crosslinked may be controlled considering the interrelation between the safety of a battery and the quality thereof. Additionally, the crosslinked polymer may be used in an amount independently controlled at a cathode and an anode. The crosslinked polymer that has swelled with an electrolyte is present in an amount of at least 0.01 wt %, preferably of between 0.01 and 50 wt %, based on the weight of the electrode active material.

The electrode including the crosslinked polymer introduced onto the surface of the electrode active material has reduced porosity compared to the electrode not including the crosslinked polymer. The porosity of the pores formed by the electrode active material particles in the electrode including the crosslinked polymer is preferably controlled in a range of between 1% and 50%. Pores of an electrode are the portions, which are to be filled with an electrolyte. When the porosity of the electrode is less than 1%, the ratio of electrolyte (E) to electrode active material (M), i.e. E/M is too low, thereby detracting from battery quality due to insufficient lithium ion conduction. When the porosity of the electrode is more than 50%, side reactions between an electrolyte and an electrode active material occur excessively under overcharging or high-temperature storage conditions, thereby decreasing battery safety.

The electrode comprising a crosslinked polymer coated on the surface of the electrode active material particles, while maintaining the pore structure formed among the electrode active material particles, according to the present invention, may be obtained by the following method.

For example, a method for manufacturing the electrode according to the present invention, includes the steps of: applying slurry comprising an electrode active material optionally with a binder and/or a conductive agent, prepared by a conventional method, onto a current collector, followed by drying, to provide an electrode; dipping the electrode into a solution, in which monomers forming a crosslinked polymer are dispersed or dissolved, to form a coating layer on the electrode, as shown in FIG. 1; and allowing the solvent to evaporate, and then drying the coated electrode.

Although there is no particular limitation in the solvent used in the above method, it is preferable that the solvent has a solubility parameter similar to that of the monomers to be used and a low boiling point. This is because such solvents can be mixed uniformly with the monomers and can be removed easily after coating the polymer. Non-limiting examples of the solvents that may be used include acetone, tetrahydrofuran, methylene chloride, chloroform, dimethylformamide, N-methyl-2-pyrrolidone, cyclohexane, water and mixtures thereto.

Additionally, it is preferable that the polymer solution further comprises a small amount of a crosslinking initiator generally known to one skilled in the art, so as to be cured via heat or light irradiation.

When the monomers (crosslinking agents) are dissolved into the solvent, the content of the monomers in the solution should be controlled so as not to be higher than such concentration that the pores on the electrode surface are completely filled with the monomers. If the content of the monomers forming the crosslinked polymer is excessively high, the viscosity of solution increases, and thus the crosslinking agents may not infiltrate into the pores of the electrode but may be present on the electrode surface. Hence, it is difficult to control the reaction between the electrode and the electrolyte. Further, the layer additionally formed on the electrode surface, which serves as a resistance layer, causes degradation in the quality of a battery. On the other hand, if the content of the crosslinking agents in the solution is excessively low, the amount of monomers to be present on the surface of electrode active materials is also low. Hence, the content of the crosslinking agents is insufficient for controlling the reaction between the electrode and an electrolyte. Although the content of the crosslinking agent in the solution may be varied depending on the kind of the monomer or solvent to be used, the viscosity of the solution and the porosity of the electrode, it is controlled preferably in a range of between 0.1 and 90 wt %.

In order to coat the electrode with the polymer solution, any methods known to one skilled in the art may be used. It is possible to use various processes including dip coating, die coating, roll coating, comma coating or combinations thereof.

Figure 2:
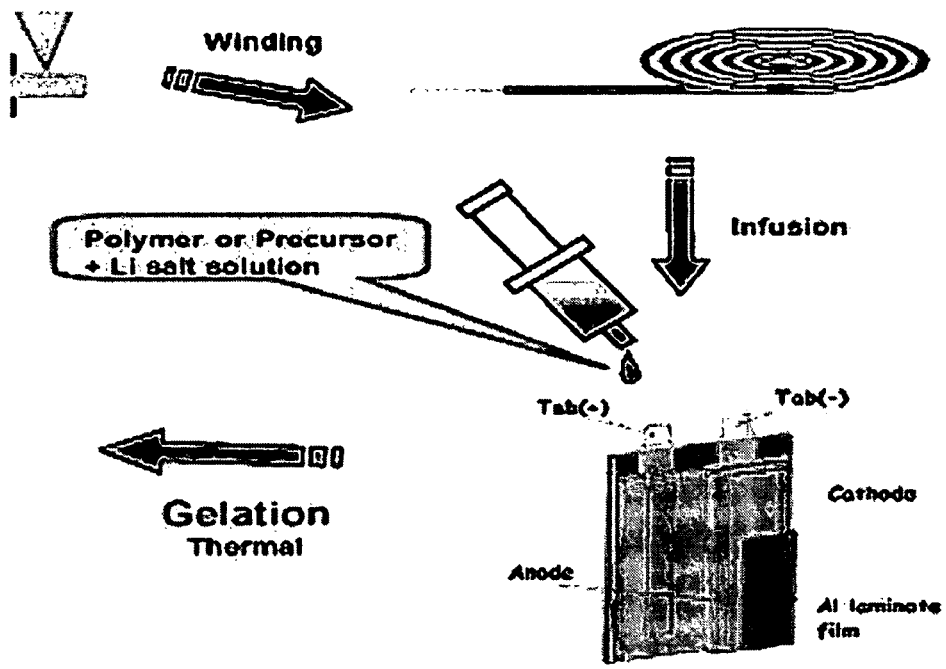
FIG. 2 is a schematic view showing a conventional process for preparing a gel type polymer electrolyte according to the prior art.

Then, the electrode having the coating layer of the monomers forming a crosslinked polymer as described above is cured under adequate conditions, for example, via heat or UV irradiation, so as to form a three-dimensionally crosslinked coating layer on the surface of the electrode active material particles. Meanwhile, in the case of a crosslinkable gel type polymer electrolyte according to the prior art (SANYO, JP 2000-299129), electrolyte containing crosslinkable monomers is injected into a battery after the assemblage thereof and then crosslinked under adequate conditions to perform the in situ formation of the gel type polymer electrolyte in the battery. Hence, the bulk volume in the electrode of the battery is completely filled with the gel type polymer electrolyte according to the prior art (see FIG. 2). On the contrary, in the case of the electrode according to the present invention, the crosslinked polymer coating layer is present, as a uniform and single phase, on the surface of electrode active material particles, which otherwise may cause side reactions with an electrolyte, while maintaining the pore structure formed by the interstitial volumes of the electrode active material particles (see FIG. 3). Therefore, it is possible to improve the safety and quality of a battery.

Additionally, according to the prior art, an electrode active material is coated with a conductive polymer or inorganic particles before the manufacture of an electrode. On the contrary, according to the present invention, an electrode is manufactured first by a conventional method, and then the electrode is dipped into a solution containing a polymer to form a coating layer thereon. Therefore, aggregation of electrode active materials or separation of the binder coated on the active material does not occur. Further, because the distribution and structure among constitutional elements of an electrode can be maintained substantially, basic properties, such as capacity or quality of a battery, and structural stability of a battery can also be maintained for a long period of time.

According to still another aspect of the present invention, there is provided an electrochemical device comprising a cathode, an anode, a separator interposed between the cathode and the anode, and an electrolyte, wherein either or both of the cathode and the anode are coated with a crosslinked polymer on the surface of electrode active material particles interconnected to each other, while maintaining the pore structure formed among the electrode active material particles.

Herein, the electrode may be either or both a cathode and an anode. Preferably, the electrode is a cathode. In other words, when the electrode according to the present invention, which has a coating layer of crosslinked polymer formed on the surface of electrode active material particles interconnected to each other while maintaining the pore structure formed among the electrode active material particles, is a cathode, it is possible to improve the safety of a battery by controlling the reaction heat, generated from the side reactions between the cathode active material and the electrolyte, by virtue of the polymer coating layer on the cathode. Additionally, an anode forms a solid electrolyte interface (SEI) film when it is in contact with a conventional electrolyte and performs general electrochemical reactions in a battery. Hence, it is possible to minimize degradation in the quality of a battery, caused by the introduction of the polymer coating layer. Therefore, it is possible to improve the safety of a battery while not adversely affecting the quality of a battery.

The electrochemical device includes any devices in which electrochemical reactions occur and particular examples thereof include all kinds of primary batteries, secondary batteries, fuel cells, solar cells or capacitors.

To manufacture the electrochemical device by using the electrode according to the present invention, any method generally known to one skilled in the art may be used, In one embodiment of the method, an electrode assembly is provided by using the electrodes according to the present invention and a separator interposed between both electrodes, and then an electrolyte is injected thereto.

Herein, when an electrolyte is injected into an electrode assembly, which includes the electrode coated with a crosslinked polymer (preferably crosslinked polymer swellable with an electrolyte) on the surface of electrode active material particles interconnected to each other, and a separator, the crosslinked polymer is swelled with the electrolyte depending on the physical properties of the polymer coated on the surface of the electrode active material. When the crosslinked polymer is swelled by the injection of the electrolyte and contains a solvent, the solvent content in the polymer is preferably controlled to a range of 0.1~20 wt %, based on the weight of the polymer before the injection of the electrolyte. However, the solvent content is not limited to the above range. The solvent content may be controlled depending on the polymer to be used, the kind of the solvent, the viscosity of the solution and the porosity of the electrode, as long as the pores formed among the electrode active material particles are not completely filled with the resultant polymer.

Additionally, when the crosslinked polymer coated on the surface of the electrode active material is a polymer that is swellable with an electrolyte, the polymer has high affinity to an electrolyte, and thus the electrode coated with the polymer also has high increased affinity to an electrolyte. Therefore, the contact angle between the electrode coated with the crosslinked polymer and the electrolyte decreases, preferably by 1° or more, as compared to the electrode not including the crosslinked polymer.

Further, it is preferable that the electrode coated with the crosslinked polymer shows a calorific value to an electrolyte, decreased by 0.01 J/g or more, as compared to the calorific value of the electrode including no crosslinked polymer to the same electrolyte. It is also preferable that the peak temperature, where the calorific value of the electrode to the electrolyte reaches the maximum value when the external temperature increases, is increased by 0.01° C. or higher, as compared to the electrochemical device according to the prior art.

Preferably, the electrochemical device obtained as described above is a lithium secondary battery, including a lithium metal secondary battery, a lithium ion secondary battery, a lithium polymer secondary battery or a lithium ion polymer secondary battery.

Herein, the electrode, which is coated with a coating layer of crosslinked polymer, may be formed by applying electrode active material onto a current collector according to a method known to one skilled in the art. Particularly, the cathode active material may include any conventional cathode active material currently used in a cathode of a conventional electrochemical device. Particular non-limiting examples of the cathode active material include lithium intercalation materials such as lithium manganese oxides, lithium cobalt oxides, lithium nickel oxides, lithium iron oxides or composite oxides thereof. Additionally, the anode active material may include any conventional anode active material currently used in an anode of a conventional electrochemical device. Particular non-limiting examples of the anode active material include lithium intercalation materials such as lithium metal, lithium alloys, carbon, petroleum coke, activated carbon, graphite or other carbonaceous materials. Non-limiting examples of a cathode current collector include foil formed of aluminum, nickel or a combination thereof. Non-limiting examples of an anode current collector include foil formed of copper, gold, nickel, copper alloys or a combination thereof.

The electrolyte that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^{31}$, $I^-$, $ClO_4^-$, $ASF_6^-$, $CH_3CO_2^-$, $CF_3SO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone) and mixtures thereof. However, the electrolyte that may be used in the present invention is not limited to the above examples.

More particularly, the electrolyte may be injected in a suitable step during the manufacturing process of an electrochemical device, according to the manufacturing process of a final product and desired properties. In other words, electrolyte may be injected, before an electrochemical device is assembled or in a final step during the assemblage of an electrochemical device.

Although there is no particular limitation in the separator that may be used in the present invention, a porous separator may be used and particular examples thereof include polypropylene-based, polyethylene-based, and polyolefin-based porous separators.

Further, although there is no particular limitation in the outer shape of the electrochemical device obtained by the above method, the electrochemical device may be a cylindrical, prismatic, pouch-type or coin-type electrochemical device.

BEST MODE FOR CARRYING OUT THE INVENTION

Reference will now be made in detail to the preferred embodiments of the present invention. It is to be understood that the following examples are illustrative only and the present invention is not limited thereto.

EXAMPLE 1

Manufacture of Electrode Having Crosslinked Polymer and Lithium Secondary Battery Comprising the Same (Manufacture of Cathode)

To N-methyl-2-pyrrolidone (NMP) as a solvent, 94 wt % of lithium cobalt composite oxide ($LiCoO_2$) as a cathode active material, 3 wt % of carbon black as a conductive agent and 3 wt % of PVDF (polyvinylidene fluoride) as a binder were added to form slurry for a cathode. The slurry was coated on aluminum (Al) foil having a thickness of 20 µm as a cathode collector and dried to form a cathode.

TA10 crosslinking agent represented by the following formula 3 and AIBN (azobisisobutyronitrile) as a crosslinking initiator were dissolved into acetone at about 30° C. for about 1 hour to prepare a solution. At this time, the TA10 crosslinking agent and AIBN were used in an amount of 10 wt % and 0.2 wt %, respectively. Next, the cathode preliminarily manufactured as described was dipped into the solution for about 1~3 minutes in a dip coating manner until the bubbles present in the pores were totally evacuated. Then, the coated cathode was dried under vacuum at room temperature. After drying, heat curing was performed in a hot air oven under the conditions of 90° C./10 minutes to provide a cathode coated with a crosslinked polymer.

(Manufacture of Anode)

To N-methyl-2-pyrrolidone (NMP) as a solvent, 96 wt % of carbon powder as an anode active material, 3 wt % of PVDF (polyvinylidene fluoride) as a binder and 1 wt % of carbon black as a conductive agent were added to form mixed slurry for an anode. The slurry was coated on copper (Cu) foil having a thickness of 10 µm as an anode collector and dried to form an anode.

(Assemblage of Battery)

The cathode and anode obtained as described above were stacked with a separator comprising three layers of polypropylene/polyethylene/polypropylene (PP/PE/PP) to provide an electrode assembly. Then, an electrolyte (ethylene carbonate (EC)/propylene carbonate (PC)/diethyl carbonate (DEC)= 30/20/50 (wt %) containing 1 M of lithium hexafluorophosphate (LiPF$_6$)) was injected thereto to provide a battery.

injected into the electrode assembly. Then, heat curing was performed in an oven at 80° C. for 1 hour in order to provide a battery.

EXPERIMENTAL EXAMPLE 1

Analysis of Electrode Surface

The following test was performed to analyze the surface of the electrode according to the present invention.

The sample used in this test was the electrode obtained according to Example 1. The cathode of Comparative Example 1, obtained by a conventional method, was used as a control.

When analyzed the electrode surface by using Scanning Electron Microscope (SEM), the electrode coated with a crosslinked polymer according to the present invention showed a pore structure similar to the pore structure of the cathode according to Comparative Example 1, which were obtained by the conventional method and had no coating layer. Therefore, it can be seen that the electrode according to the present invention can maintain the pore structure formed among the electrode active material particles (see FIG. 3).

EXPERIMENTAL EXAMPLE 2

Evaluation for Safety of Lithium Secondary Battery

The following test was performed to evaluate the safety of the lithium secondary battery comprising the electrode coated with a crosslinked polymer according to the present invention.

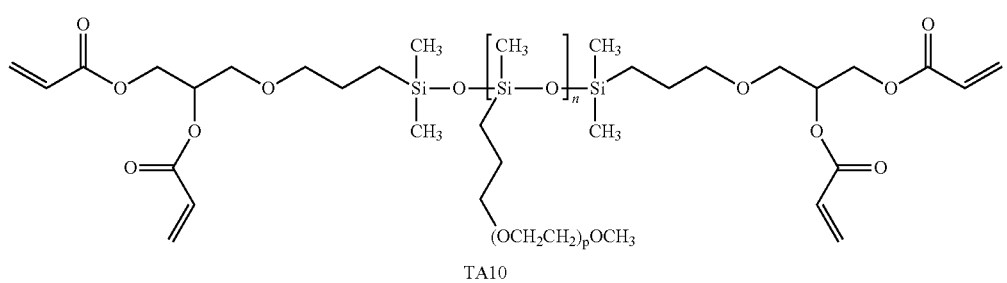

[Formula 3]

TA10

(n = 10, p = 3)

COMPARATIVE EXAMPLES 1-2

Comparative Example 1

Example 1 was repeated to provide a lithium secondary battery, except that the cathode was manufactured by using a conventional method without using any polymer.

Comparative Example 2

An electrode assembly (including a cathode, an anode and a separator) was manufactured in a conventional manner. Next, a mixed solution, containing diethyleneglycol diacrylate as a monomer and AIBN (azobisisobutyronitrile) as an initiator, was mixed with the same electrolyte as used in Example 1 in an amount of 10 wt %, and the mixture was The sample used in this test was the electrode obtained according to Example 1. Each of the cathodes according to Comparative Examples 1 and 2, obtained by the conventional method, was used as a control. After each battery was charged to 4.2V, the battery was disassembled to separate the cathode and thermal safety was evaluated to a temperature of 400° C. by DSC (differential scanning calorimetry).

Figure 4:
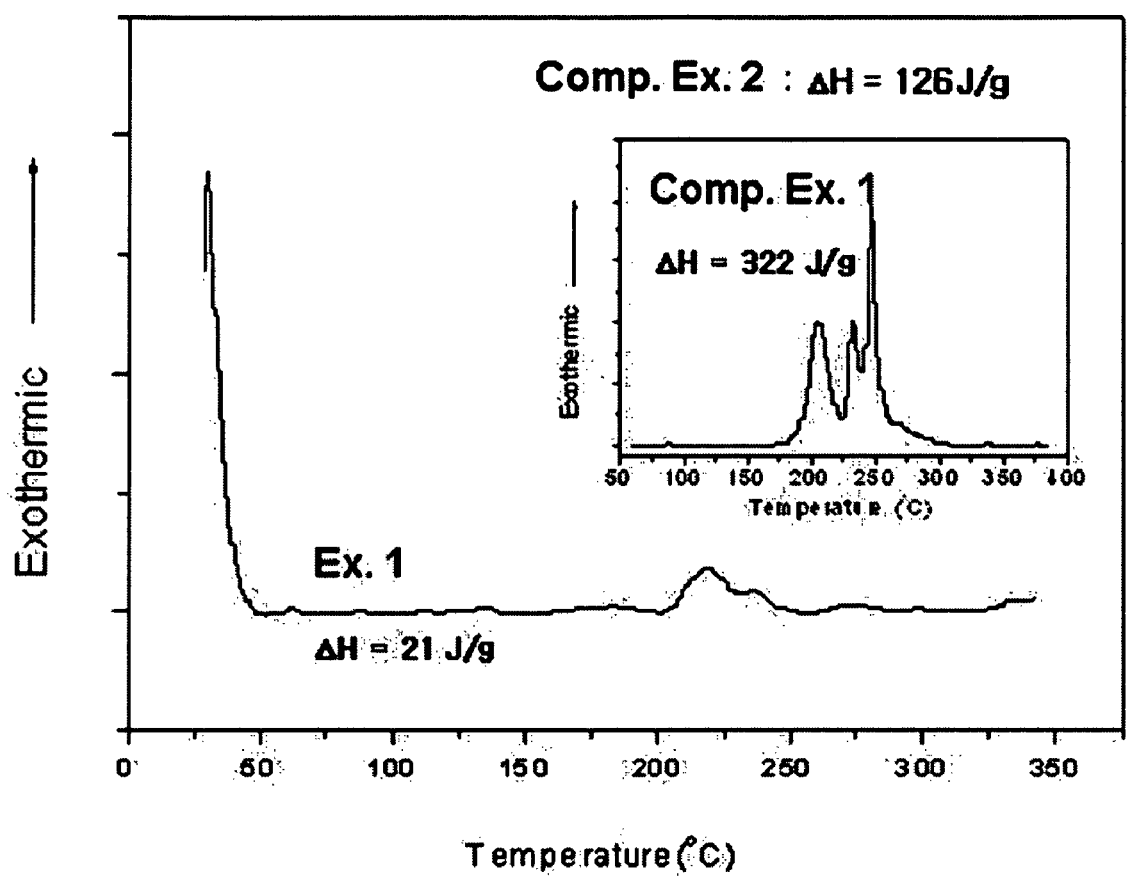
FIG. 4 is a graph showing the calorific value of the reaction between a cathode and an electrolyte, in each of the batteries obtained from Example 1 and Comparative Examples 1 and 2.

After the test, the lithium secondary battery of Example 1, comprising the electrode having a crosslinked polymer introduced onto the surface, showed a calorific value, which was significantly reduced as compared to the calorific values of the batteries according to Comparative Examples 1 and 2, comprising the electrodes obtained by the conventional method (see FIG. 4). Therefore, it can be seen from the above results that the coating layer of crosslinked polymer significantly inhibits side reactions between the electrode active material and the electrolyte, and thus improves the thermal safety of the battery.

EXPERIMENTAL EXAMPLE 3

Evaluation for Quality of Lithium Secondary Battery

The following test was performed to evaluate the C-rate characteristics of the lithium secondary battery comprising the electrode coated with a crosslinked polymer according to the present invention.

The sample used in this test was the electrode obtained according to Example 1. Each of the cathodes according to Comparative Examples 1 and 2, obtained by the conventional method, was used as a control. Each battery having a capacity of 760 mAh was subjected to cycling at a discharge rate of 0.2 C, 0.5 C, 1 C and 2 C. The discharge capacity of each battery was expressed on the C-Rate basis.

Figure 5:
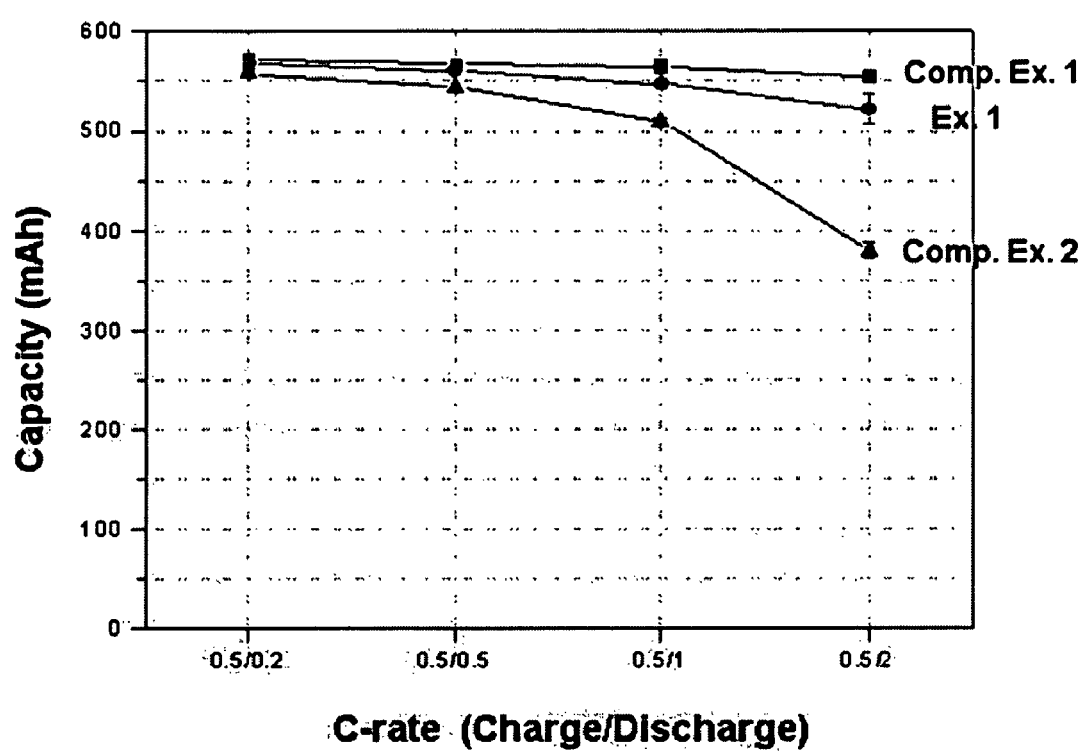
FIG. 5 is a graph showing the charge/discharge capacity of each of the batteries according to Example 1 and Comparative Examples 1 and 2.

After the test, the lithium secondary battery of Example 1, comprising the electrode coated with a crosslinked polymer according to the present invention, showed C-rate characteristics comparable to those of the battery according to Comparative Example 1, comprising the conventional electrode, to the extent of a discharge rate of 1 C, with the exception of slightly degraded characteristics at a discharge rate of 2 C. Meanwhile, the battery according to Comparative Example 2, in which crosslinking occur totally over the battery, shows significantly degraded C-rate characteristics at a discharge rate of greater than 1 C (see FIG. 5).

INDUSTRIAL APPLICABILITY

As can be seen from the foregoing, the electrode according to the present invention, which comprises a coating layer of crosslinked polymer formed on the surface of the electrode active material particles, can improve the safety of a battery, while minimizing degradation in the quality of a battery.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A lithium ion secondary battery comprising a cathode, an anode, a separator interposed between the cathode and the anode, and a liquid electrolyte, wherein the cathode comprises a coating layer of crosslinked polymer formed on a surface of electrode active material particles, while maintaining a pore structure formed among the electrode active material particles interconnected to each other in the cathode, and the coating layer of the crosslinked polymer has a thickness of 1 nm ~1 μm, wherein the crosslinked polymer is formed by crosslinking at least one monomer selected from the group consisting of the compounds represented by the following formula 1 and formula 2:

[Formula 1]
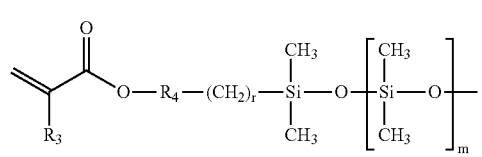

[Formula 2]
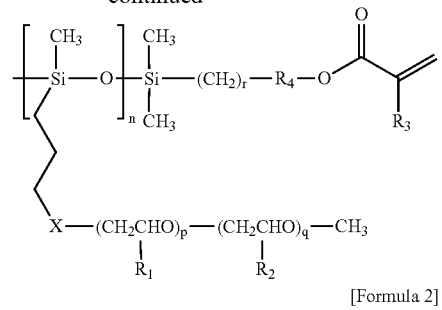

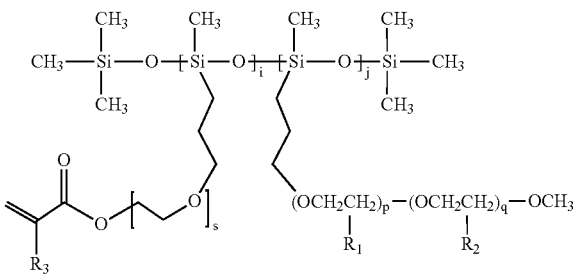

wherein each of $R_1$, $R_2$ and $R_3$ independently represents a hydrogen atom or a C1~C6 lower alkyl group;

$R_4$ represents a single bond or

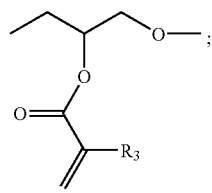

X represents

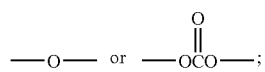

each of n and m represents an integer of 0~1000, each of p and q is an integer of 0~20 with the proviso that p and q cannot represent 0 at the same time, and r is an integer of 1~6; and each of i and j represents an integer of 1~1000, and s is an integer of 1~20, and the liquid electrolyte includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC) and gamma-butyrolactone (γ-butyrolactone).

2. The lithium ion secondary battery according to claim 1, wherein the coating layer of crosslinked polymer is present as an independent phase on the surface of the electrode active material particles and on the surface of a binder for interconnecting and fixing the electrode active material particles.

3. The lithium ion secondary battery according to claim 1, wherein the electrode is obtained by dipping a preliminarily formed electrode into a solution, in which monomers forming the crosslinked polymer are dissolved, to form a coating layer of the monomers forming the crosslinked polymer on the surface of the electrode active material particles interconnected to each other, and by crosslinking the monomers via curing.

4. The lithium ion secondary battery according to claim 1, wherein the crosslinked polymer is swelled with an electrolyte for a battery.

5. The lithium ion secondary battery according to claim 1, wherein the electrode has a porosity of 1~50%.

6. A method for manufacturing an electrode comprising a coating layer of crosslinked polymer, formed on a surface of electrode active material particles, while maintaining a pore structure formed among the electrode active material particles interconnected to each other in the electrode, the method' comprising the steps of:
   (a) applying slurry comprising an electrode active material onto a current collector and drying the slurry to provide an electrode;
   (b) dipping the electrode obtained from step (a) into a solution in which monomers forming the crosslinked polymer are dissolved, followed by drying; and
   (c) curing the electrode coated with the monomers, wherein the monomer forming the crosslinked polymer is at least one monomer selected from the group consisting of the compounds represented by the following formula 1 and formula 2:

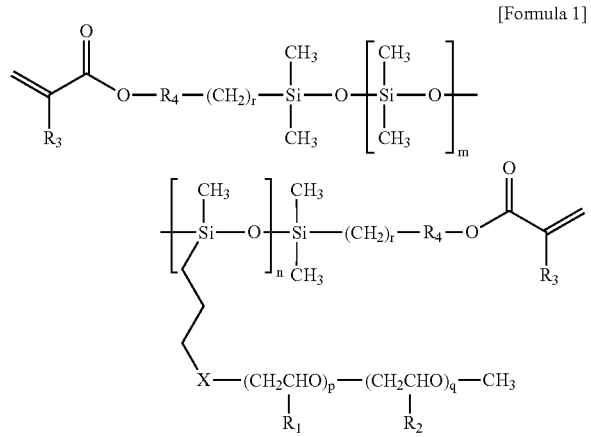

[Formula 1]

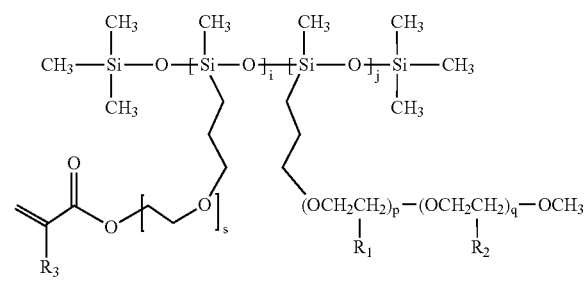

[Formula 2]

wherein each of $R_1$, $R_2$ and $R_3$ independently represents a hydrogen atom or a C1~C6 lower alkyl group;

$R_4$ represents a single bond or

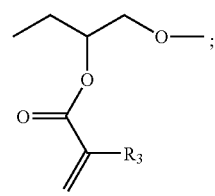

X represents

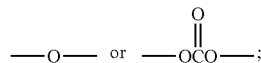

each of n and m represents an integer of 0~1000, each of p and q is an integer of 0~20 with the proviso that p and q cannot represent 0 at the same time, and r is an integer of 1~6; and each of i and j represents an integer of 1~1000, and s is an integer of 1~20.

7. The method according to claim 6, wherein the monomers forming the crosslinked polymer are present in an amount of 0.1~90 wt % based on 100 wt % of the solution used in step (b).

8. The method according to claim 6, wherein the solution used in step (b) further comprises a thermal initiator or a UV initiator.

* * * * *